United States Patent
Gelez et al.

(10) Patent No.: US 8,275,537 B2
(45) Date of Patent: Sep. 25, 2012

(54) METHOD AND DEVICE FOR CONTROLLING A VALVE WITH SEVERAL LIFT PHASES, AND METHOD FOR SUPPLYING A THERMAL ENGINE WITH OXIDANT

(75) Inventors: Nicolas Gelez, Le Pecq (FR); Damien Fournigault, Conflans-Sainte-Honorine (FR); Jean-Guilhem Dalissier, Charleval (FR); Julien Hobraiche, Chevrieres (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 237 days.

(21) Appl. No.: 12/602,422

(22) PCT Filed: May 28, 2008

(86) PCT No.: PCT/FR2008/000727
§ 371 (c)(1),
(2), (4) Date: Mar. 19, 2010

(87) PCT Pub. No.: WO2009/004162
PCT Pub. Date: Jan. 8, 2009

(65) Prior Publication Data
US 2010/0204900 A1 Aug. 12, 2010

(30) Foreign Application Priority Data
May 30, 2007 (FR) ...................................... 07 03835

(51) Int. Cl.
*F01L 9/04* (2006.01)
*F02D 41/00* (2006.01)

(52) U.S. Cl. ..................... 701/105; 701/110; 123/90.11; 123/90.15

(58) Field of Classification Search ................ 123/90.11, 123/90.15, 345–348; 701/105, 110
See application file for complete search history.

(56) References Cited

U.S. PATENT DOCUMENTS

| | | | |
|---|---|---|---|
| 6,182,621 B1 * | 2/2001 | Salber et al. ............... | 123/90.15 |
| 6,196,172 B1 * | 3/2001 | Cosfeld et al. ............. | 123/90.11 |
| 6,505,113 B2 * | 1/2003 | Eichenseher et al. ......... | 701/114 |
| 6,684,835 B2 * | 2/2004 | Komazawa et al. ....... | 123/90.17 |
| 7,007,920 B2 * | 3/2006 | Nishida et al. ........... | 251/129.04 |
| 7,415,950 B2 * | 8/2008 | Ervin et al. ................ | 123/90.11 |
| 2008/0178826 A1 * | 7/2008 | Ervin et al. ................ | 123/90.11 |

FOREIGN PATENT DOCUMENTS
DE 197 33 139 A1 2/1999
(Continued)

OTHER PUBLICATIONS

International Search Report issued in PCT/FR2008/000727, mailed on Feb. 24, 2009, with translation, 6 pages.

*Primary Examiner* — Hai Huynh
(74) *Attorney, Agent, or Firm* — Osha • Liang LLP

(57) ABSTRACT

The invention relates to a method for controlling a valve (13) in a thermal engine (10), the valve having a closed position and an opened position, the method comprising at least one step of opening the valve, said step including at least one phase (I) for bringing the valve into an open position and a phase (II) for maintaining the valve in an intermediate position between the closed position and the opened position. The invention also relates to a device for implementing this method and to a method for supplying an engine with an oxidant.

11 Claims, 2 Drawing Sheets

FOREIGN PATENT DOCUMENTS

| | | |
|---|---|---|
| DE | 197 56 342 A1 | 7/1999 |
| DE | 198 36 297 A1 | 2/2000 |
| DE | 199 26 506 A1 | 12/2000 |
| DE | 199 38 749 A1 | 3/2001 |
| DE | 101 06 169 A1 | 8/2002 |
| DE | 102 06 031 A1 | 9/2003 |
| EP | 0 973 178 A2 | 1/2000 |
| FR | 2 297 321 A1 | 8/1976 |
| FR | 2 808 564 A1 | 11/2001 |
| FR | 2 878 891 A1 | 6/2006 |
| WO | 00/63535 A1 | 10/2000 |
| WO | 01/40643 A1 | 6/2001 |

* cited by examiner

METHOD AND DEVICE FOR CONTROLLING A VALVE WITH SEVERAL LIFT PHASES, AND METHOD FOR SUPPLYING A THERMAL ENGINE WITH OXIDANT

The present invention relates to a method and a device for controlling a valve with several phases of lift. This method and this device can be used for example to control the valves of a motor vehicle combustion engine. Another subject of the invention is a method for supplying the combustion engine with oxidant.

BACKGROUND OF THE INVENTION

The combustion engines used in the automotive field generally comprise an engine block delimiting cylinders that have one end closed by a cylinder head and have sliding within them pistons which are connected to a crank shaft. In four-stroke engines, the cylinder head is provided with intake and exhaust ducts respectively associated with intake and exhaust valves each of which can move between an open position in which it places the cylinder and the corresponding duct in communication, and a closed position in which it isolates the cylinder from the corresponding duct.

To actuate the valves, particularly the intake valves, it is now planned to make use of control devices comprising an electromagnetic actuator associated with at least one valve and connected to a control unit that has been programmed to control the actuator as a function of predetermined parameters regarding the optimal running of the engine, particularly the charge of air to be introduced into the cylinder.

There are various ways of controlling the valves, notably the EIVC and the LIVO modes. In the EIVC mode (this recognized abbreviation originating from the English "Early Intake Valve Closing"), the valve is opened and then closed as soon as the amount of air introduced is sufficient. This method of control makes it possible to reduce the pumping losses which are incidentally often present in engines in which the valves are actuated in the conventional way by a cam shaft. However, this method of control does not encourage the formation of turbulence in the cylinder during air intake, leading to a relatively poor combustion efficiency. In the LIVO mode (this recognized abbreviation originating from the English "Late Intake Valve Opening") the intake valve is opened late, when power is being produced in the cylinder because of the downward movement of the piston, and is then closed as soon as the amount of air introduced is sufficient, as in the EIVC mode. The pumping losses are higher than in the EIVC mode alone, but the combustion efficiency is improved.

OBJECT OF THE INVENTION

It is an object of the invention particularly to provide optimized admission of air to combustion engines with controlled intake valves.

SUMMARY OF THE INVENTION

To this end, the invention provides a method for controlling a valve of a combustion engine, the valve having a closed position and an open position and the method comprising at least one step of opening the valve, this step comprising at least one phase of bringing the valve into the open position and one phase of holding the valve in an intermediate position between the closed position and the open position.

Thus, in the method of the invention, the valve is successively brought into and held in several open positions. The behaviour and flow rate of the fluid are not the same in these positions which means that successively positioning the valve in these positions allows the advantages thereof to be combined. The phase of bringing the valve into the open position either precedes or follows the phase of holding the valve in the intermediate position.

The invention also relates to a device for implementing this method.

Furthermore, another subject of the invention is a method of supplying a cylinder of a combustion engine with oxidant during an induction stroke by moving an inlet valve between a closed position and an open position, comprising at least one phase of bringing the valve into the open position and one phase of holding the valve in an intermediate position between the closed position and the open position.

The aerodynamic agitation, the rate of filling and the filling losses that result from bringing the valve into the open position and holding it in the intermediate position are notably not the same, which means that performing these two phases in succession allows the advantages thereof to be combined.

According to a first method of controlling the valve, the phase of bringing the valve into the open position precedes the phase of holding the valve in the intermediate position.

The phase of bringing the valve into the open position can be used for most of the filling of the cylinder, with limited pressure drops, whereas the phase of holding the valve in the intermediate position allows aerodynamic agitation of the charge of oxidant to be maintained in the cylinder, preferably right up until the compression stroke which follows the induction stroke, which aerodynamic agitation encourages combustion.

According to a second method of control, the phase of bringing the valve into the open position follows the phase of holding the valve in the intermediate position.

The phase of holding the valve in an intermediate position makes it easier later to move the valve into the open position by limiting the amount of energy that needs to be consumed in order to move the valve, whereas bringing the valve into the open position allows most of the filling of the cylinder to be performed with limited pressure drops. The phase of bringing the valve into the open position also here makes it possible to maintain aerodynamic agitation of the charge of oxidant in the cylinder, preferably right up to the compression stroke which follows the induction stroke.

For preference, the bringing and holding phases have durations that are determined as a function of a charge of oxidant to be introduced into the cylinder.

The charge of oxidant depends directly on the duration of the holding phases, which means that there is no need to provide a valve for this purpose in the intake duct.

Advantageously, the durations are determined in such a way that the valve is brought into the closed position near the start of an oxidant compression stroke that follows the induction stroke.

The aerodynamic agitation of the oxidant afforded by admitting the oxidant is thus maintained right up to the start of the compression stroke, and this will improve the flammability of this oxidant and make it possible to obtain good quality combustion.

Other features and advantages of the invention will emerge from reading the description which follows of some particular nonlimiting embodiments of the invention.

BRIEF DESCRIPTION OF THE DRAWINGS

Reference will be made to the attached drawings, among which.

DETAILED DESCRIPTION OF THE INVENTION

Figure 1:
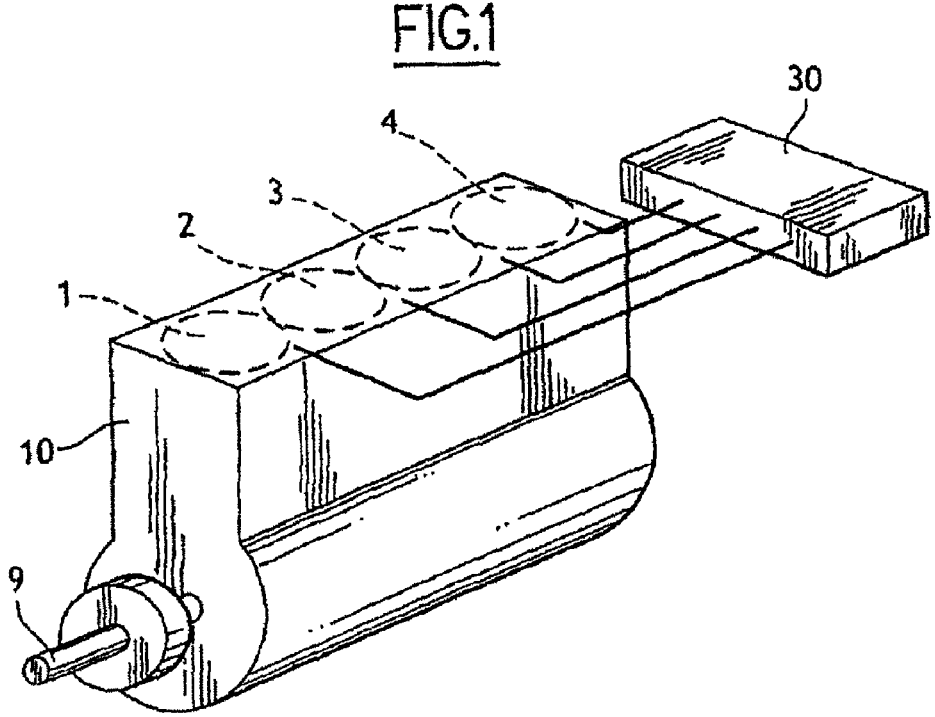
FIG. 1 is a partial schematic view of a combustion engine in which the invention can be implemented.

The invention is described here in its application to an internal combustion engine operating on a four-stroke cycle, the strokes being: induction, compression, power, exhaust.

With reference to the figures, the combustion engine according to the invention comprises an engine block 10 delimiting four in-line cylinders 1, 2, 3, 4. Cylinders 1 and 4 flank cylinders 2 and 3. Each cylinder 1, 2, 3, 4 defines a chamber 5 closed at one end by a cylinder head 6 and at the other end by a piston 7 able to slide back and forth in the cylinder 1, 2, 3, 4, between a top position (top dead center) and a bottom position (bottom dead center) and connected by a connecting rod 8 to a crank shaft 9 mounted so that it can pivot in the block 10.

Opening into each combustion chamber 5 are an intake duct 11 and an exhaust duct 12 which are formed in the cylinder head 6. The intake duct 11 and the exhaust duct 12 are respectively equipped with an intake valve 13 and with an exhaust valve 14 which are moved between two, open and closed, positions by electromagnetic actuators 15 and 16 respectively.

In a way known per se, each actuator 15, 16 comprises a body in which there are mounted two electromagnets between which there is mounted a magnetic vane secured to one end of an actuating rod the opposite end of which is designed to rest against a stem of the valve. Each actuator also comprises, in a way known per se, elastic movement means comprising, in a way known per se, a spring interposed between one face of the body of the actuator and a shoulder of the actuating rod in order to return the vane to the valve-open position and a spring interposed between one face of the cylinder block and a shoulder of the valve stem in order to return the valve to the closed position.

A spark plug 19 is mounted on the cylinder head 6 to open into the combustion chamber 5. The spark plug 19 is connected to an ignition circuit known per se and not depicted here.

An injector 20 of a fuel supply device is also mounted on the cylinder head 6.

The electromagnets are controlled by a control device 17, 18 in a way known per se via means, not depicted, providing further control for example on the basis of a reference current and of a rate of travel of the actuating rod obtained by differentiating a position signal supplied by a rod position sensor.

The control device 17, 18 known per se is an electronic unit often known as a VCU (from the English "Valve Control Unit"), comprising:
- a computerized control module incorporating a processor capable of running a program on the basis of data contained in a memory and of data transmitted to it by the engine control unit 30 (or ECU which is widely recognized and derived from the English "Engine Control Unit"),
- a power module controlled by the control module and connected to the actuator in order to power it.

The program run by the control device 17 controlling the actuator 15 of each intake valve 13 is designed to open the valve in at least one phase of bringing the valve into the open position and one phase of holding the valve in an intermediate position between the closed position and the open position. The phase of bringing the valve into the open position and the phase of holding it in the intermediate position has durations which have been determined as a function of a charge of oxidant to be introduced into the cylinder. The list of the intake valve 13 at the intermediate position may also be set on the basis of the charge of oxidant to be introduced into the cylinder.

Furthermore, the durations are determined so that the valve is brought into the closed position near the start of an oxidant compression stroke that follows the induction stroke.

In this instance, the intake valve 13 is not held in the open position: the actuator 15 is driven in such a way as to bring the valve into this position then release it in order to allow the valve to return toward its closed position.

Figure 2:
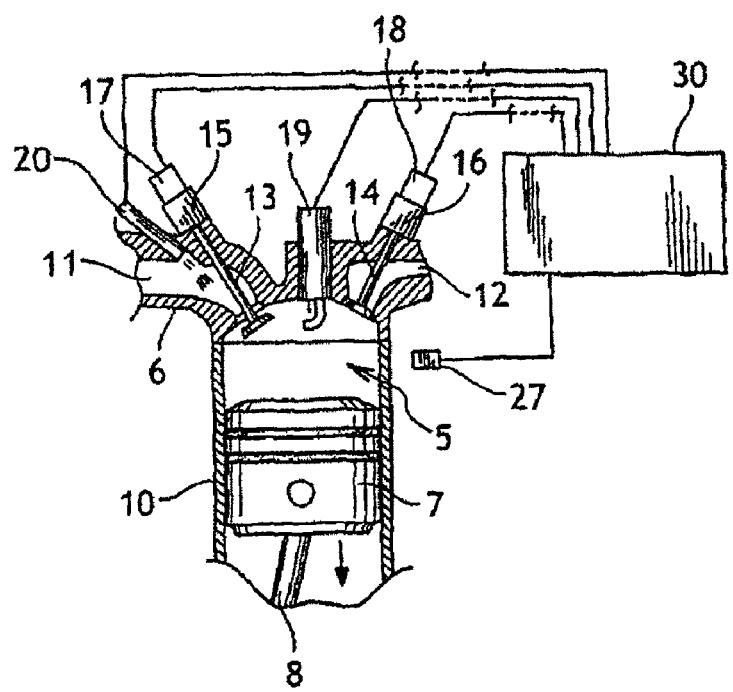
FIG. 2 is a partial schematic view of one engine of this cylinder.

With reference to FIG. 2, the phase of bringing the valve into the open position I precedes the phase of holding the valve in the intermediate position II.

Figure 3:
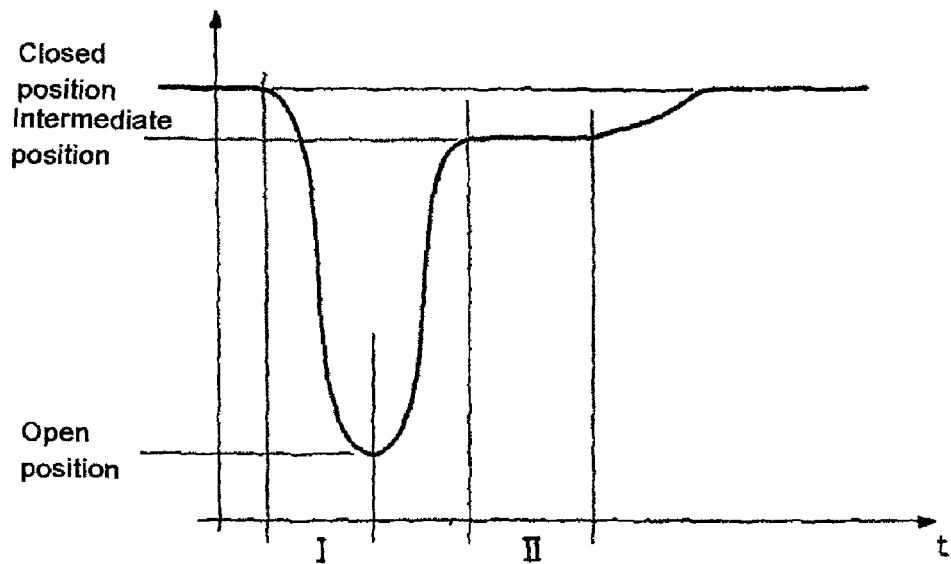
FIGS. 3 and 4 are two diagrams representing the profile with respect to time of valve lift using two control modes.
Figure 4:
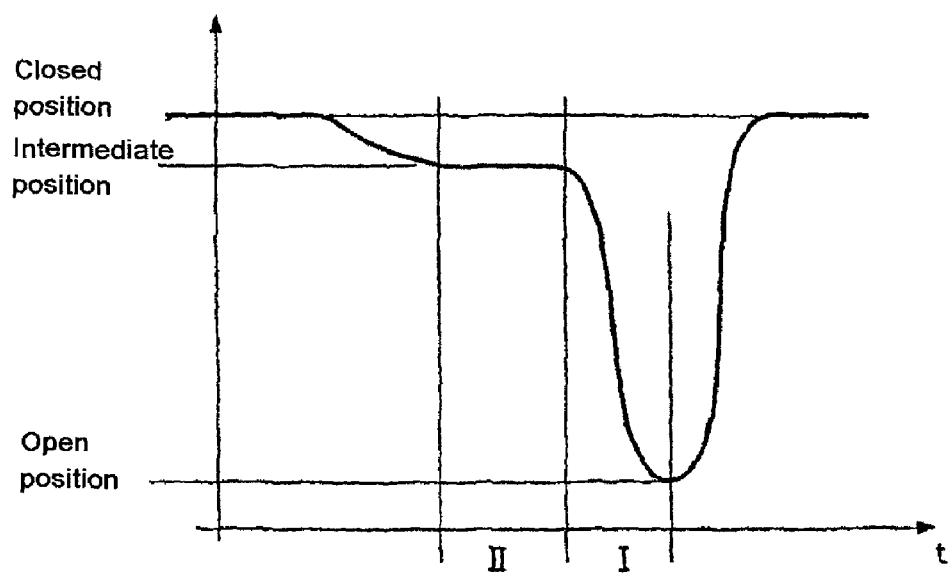

With reference to FIG. 3, the phase of bringing the valve into the open position I follows the phase of holding the valve in the intermediate position II.

In order to make the control device 17 that controls the actuator 15 execute this profile with respect to time, the control unit 30 sends, over the communication bus, frames of information allowing this profile to be reconstructed. The control device 17 stores its frames in a buffer until it detects the end of transition.

According to a first method of communication, the frames comprise triplets of information specifying:
- the desired lift (for example in mm),
- the position of the end of the previous lift (in terms of crank angle),
- the position of the start of the desired lift (in terms of crank angle).

For example, one might have the following succession of frames:
- 2 mm, 20°, 50° (frame 1),
- 10 mm, 90°, 120° (frame 2),
- 0 mm, 150°, 180° (frame 3).

The control device 17 restores these frames and applies them to the next engine cycle. The end of the definition of the profile of the succession of frames is detected by:
- the fact that the desired lift of the last frame is equal to 0 mm,
- the fact that the first frame defining the next profile ends with a desired start-of-lift position that is higher than the value in the previous frame,
- the fact that there is no information by a determined duration.

According to a second method of communication, the information is communicated in pairs of doublets specifying:
- the previous lift (for example in mm) and the position at the end of the previous lift, for example in crank angle (doublet 1),
- the next lift and the position of the start of the next lift (doublet 2).

By way of example, one might have the following succession of frames:
- 0 mm, 20° (doublet 1); 2 mm, 50° (doublet 2);
- 2 mm, 90° (doublet 1); 10 mm, 120° (doublet 2);
- 10 mm, 150° (doublet 1); 0 mm, 180° (doublet 2).

The end of the profile is determined as before.

Of course, the invention is not restricted to the embodiments described but encompasses any variant that falls within the scope of the invention as defined by the claims.

In particular, the engine and the control device may have a structure that differs from the structures described here. The invention can thus be applied to a direct-injection or indirect-injection spark-ignition or compression-ignition engine, to dual fuel engines, to other types of valve actuation (notably hydraulic valve actuation), etc.

The method of the invention can also be used in respect of the exhaust valves.

As an alternative, it is of course possible to hold the valve in the open position.

It is further possible to have more than one intermediate phase.

The valve lifts corresponding to the open position and to the intermediate position may be determined as a function of the charge of oxidant to be introduced into the cylinder.

The duration of the phase for bringing the valve into the open position and the duration of the phase of holding it in the intermediate position may be determined so that the valve is brought into the closed position before the start of the compression stroke or very shortly thereafter.

There are other conceivable methods of communicating information between the engine control unit and the valve control device. Further, the information communication methods are independent of the application described. Other information may also be exchanged.

The invention claimed is:

1. A method for controlling a valve of a combustion engine, the valve having a closed position and an open position, the method comprising:
   at least one step of opening the valve, wherein opening the valve comprises:
      at least one first phase of bringing the valve into the open position, and
      a second phase of holding the valve in an intermediate position between the closed position and the open position; and
   communicating information with an engine control unit, the information comprising a valve lift and crank angles, wherein the information is communicated in the form of frames of information, each frame comprising:
      a triplet specifying the valve lift, a crank angle at an end of a previous lift, and a crank angle corresponding to a start of a desired lift, or
      a pair of doublets, specifying a previous lift and the crank angle corresponding to the end of the previous lift, and a next lift and a crank angle corresponding to a start of the next lift.

2. The method as claimed in claim 1, in which the at least one first phase of bringing the valve into the open position precedes the second phase of holding the valve in the intermediate position.

3. The method as claimed in claim 1, in which the at least one first phase of bringing the valve into the open position follows the second phase of holding the valve in the intermediate position.

4. A device for controlling a position of a valve between a closed position and an open position, comprising:
   a valve actuator operatively connected to a computerized actuator control unit, wherein the control unit is programmed to open the valve in at least one first phase of bringing the valve into the open position and a second phase of holding the valve in an intermediate position between the closed position and the open position; and
   a system for communicating information with an engine control unit, said information comprising a valve lift and crank angles, wherein the information is communicated in the form of frames of information, each frame comprising:
      a triplet specifying the valve lift, a crank angle at an end of a previous lift, and a crank angle corresponding to the start of a desired lift, or
      a pair of doublets, specifying a previous lift and the crank angle corresponding to the end of the previous lift, and a next lift and the crank angle corresponding to a start of the next lift.

5. The device as claimed in claim 4, in which the at least one first phase of bringing the valve into the open position precedes the second phase of holding the valve in the intermediate position.

6. The device as claimed in claim 4, in which the at least one first phase of bringing the valve into the open position follows the second phase of holding the valve in the intermediate position.

7. A method of supplying a cylinder of a combustion engine with oxidant during an induction stroke by moving an inlet valve between a closed position and an open position, the method comprising:
   at least one first phase of bringing the inlet valve into the open position;
   a second phase of holding the inlet valve in an intermediate position between the closed position and the open position; and
   communicating information with an engine control unit, the information comprising a valve lift and crank angles, wherein the information is communicated in the form of frames of information, each frame comprising:
      a triplet specifying the valve lift, a crank angle at an end of a previous lift, and a crank angle corresponding to a start of a desired lift, or
      a pair of doublets, specifying a previous lift and the crank angle corresponding to the end of the previous lift, and a next lift and a crank angle corresponding to a start of the next lift.

8. The method as claimed in claim 7, in which the at least one first phase of bringing the valve into the open position precedes the second phase of holding the valve in the intermediate position.

9. The method as claimed in claim 7, in which the at least one first phase of bringing the valve into the open position follows the second phase of holding the valve in the intermediate position.

10. The method as claimed in claim 7, in which the bringing and holding phases have durations that are determined as a function of a charge of oxidant to be introduced into the cylinder.

11. The method as claimed in claim 10, in which the durations are determined such that the valve is brought into the closed position near the start of an oxidant compression stroke that follows the induction stroke.

* * * * *